Jan. 2, 1934.                R. P. MUELLER                1,941,616
                          AIRCRAFT CONTROL SYSTEM
                            Filed July 5, 1932            5 Sheets-Sheet 1
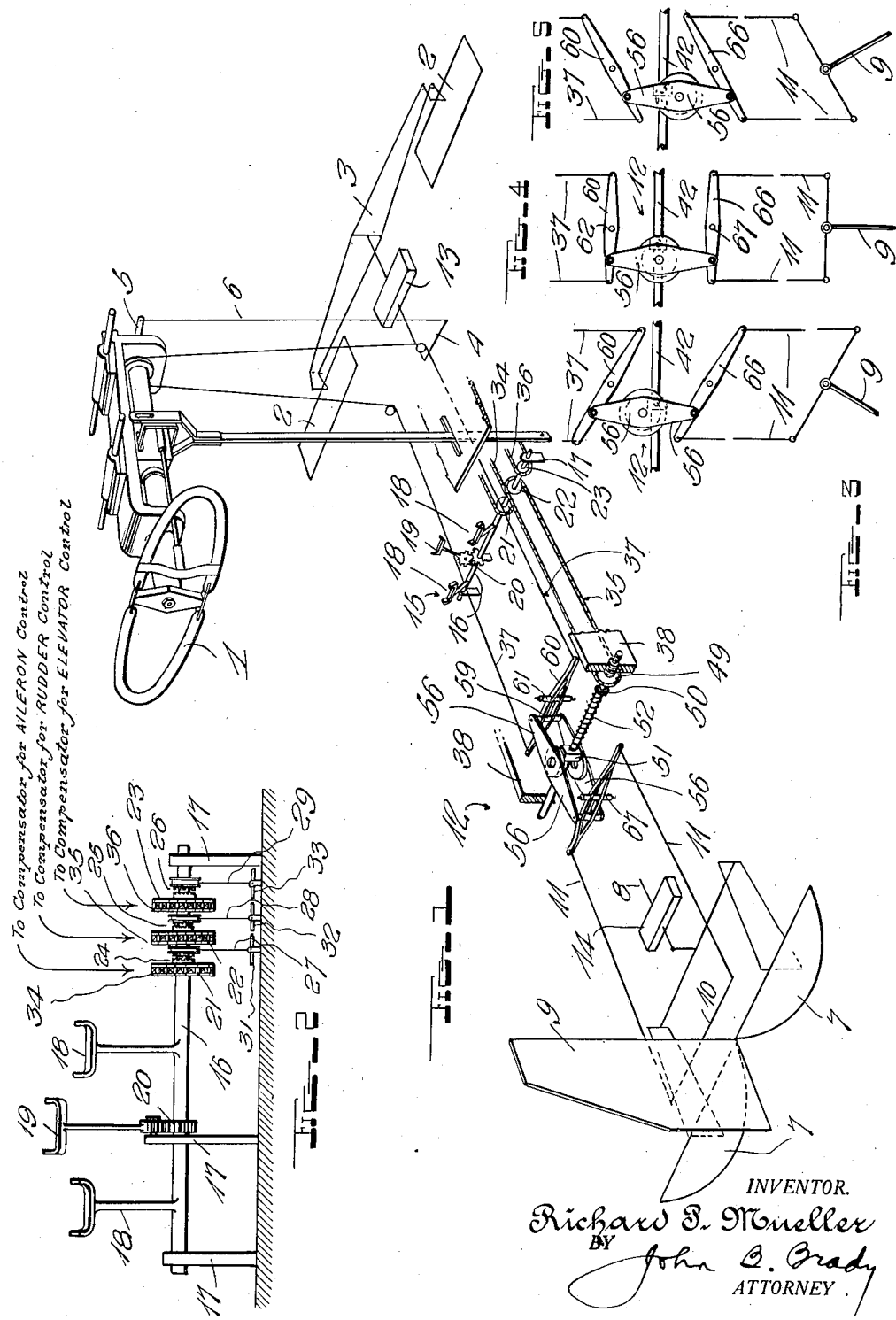
INVENTOR.
Richard P. Mueller
BY John C. Brady
ATTORNEY

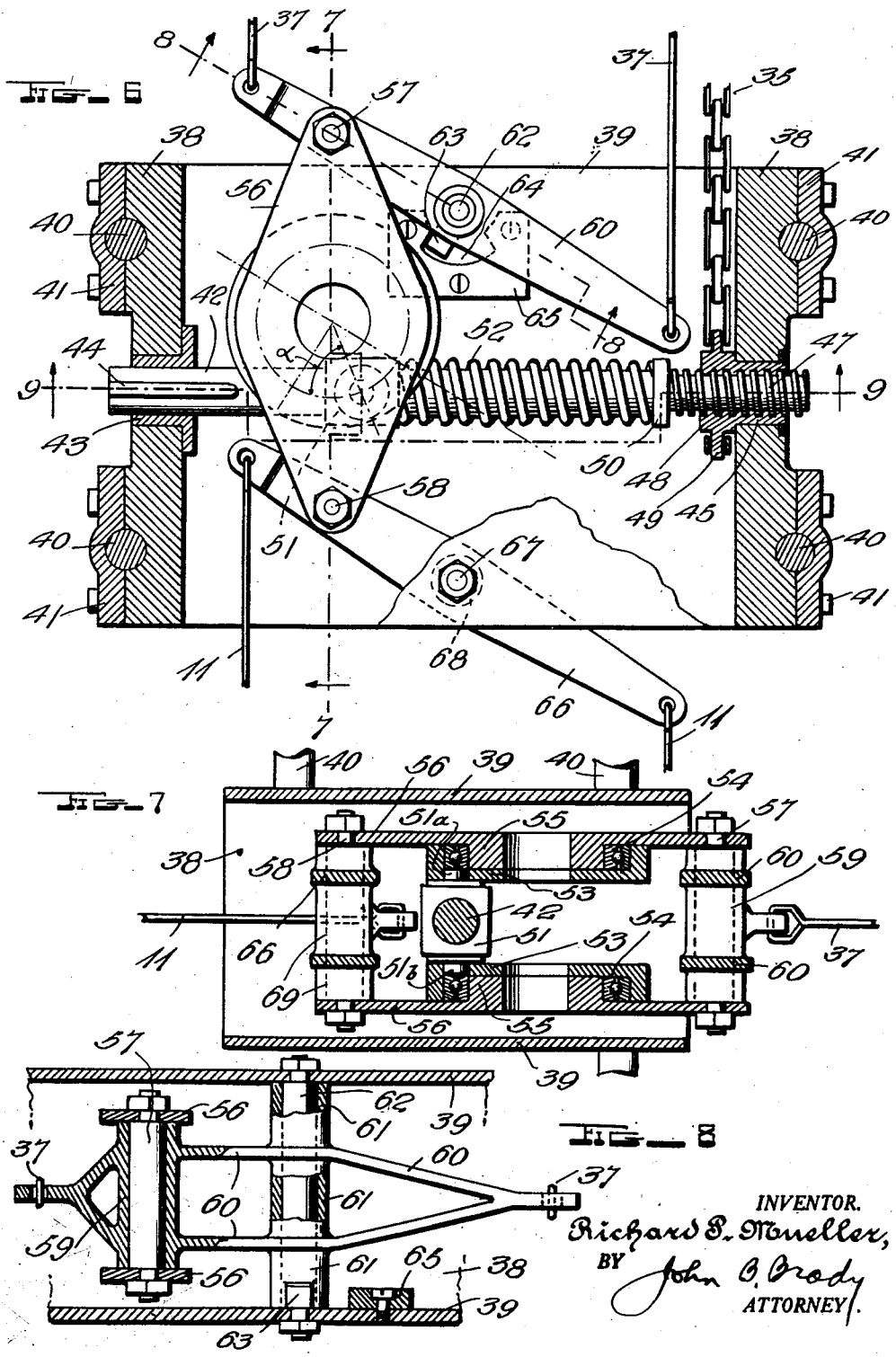

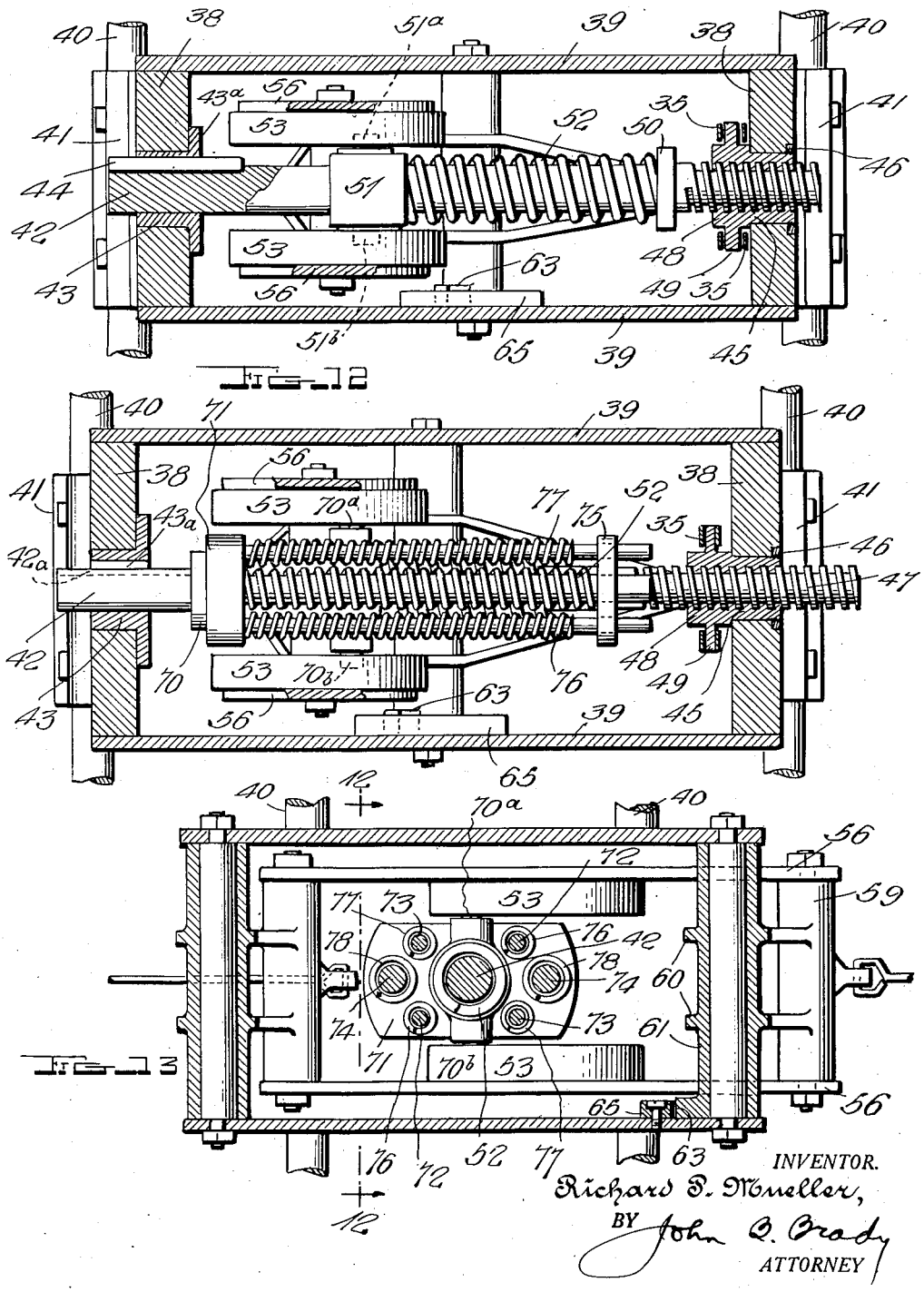

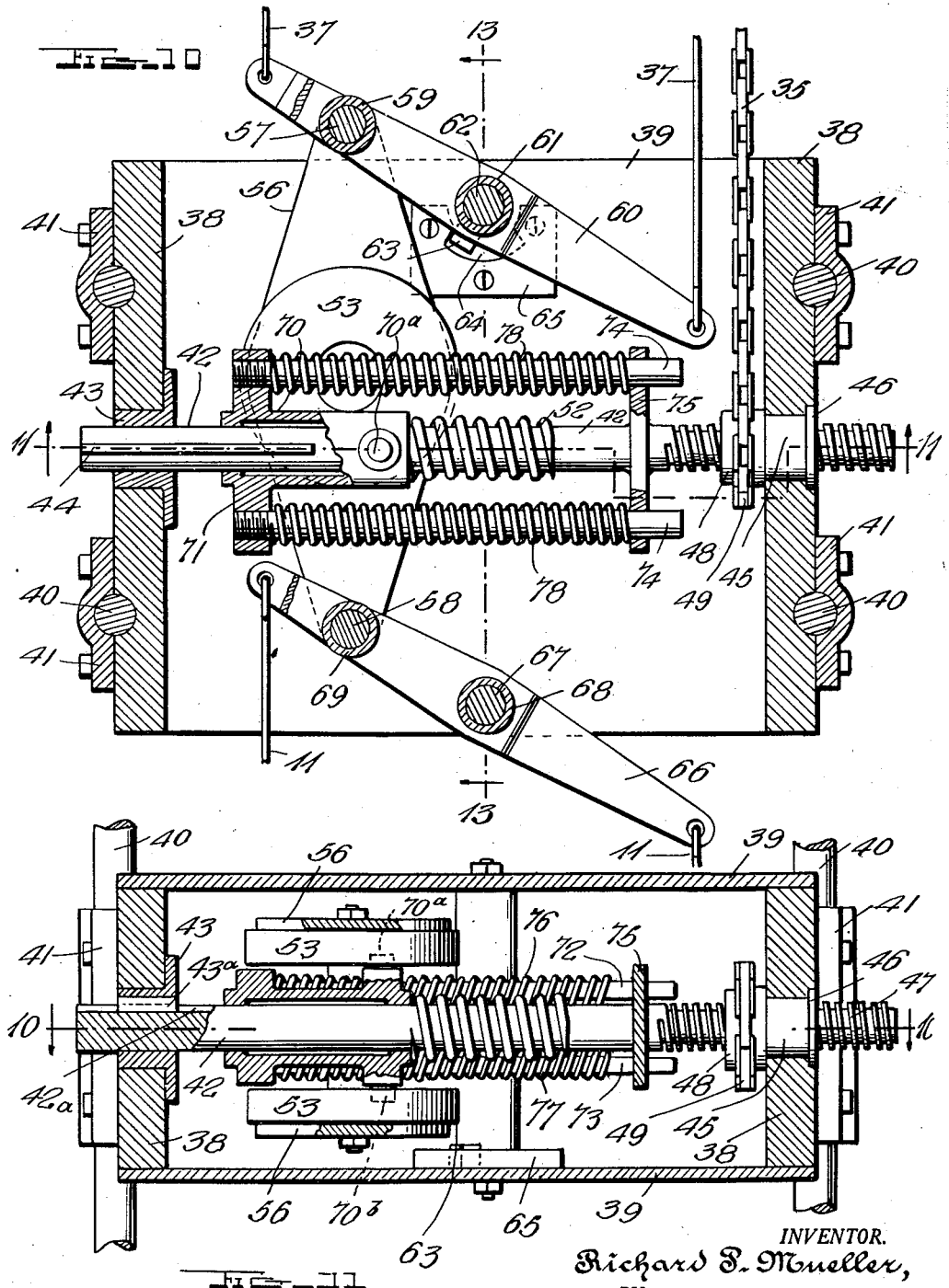

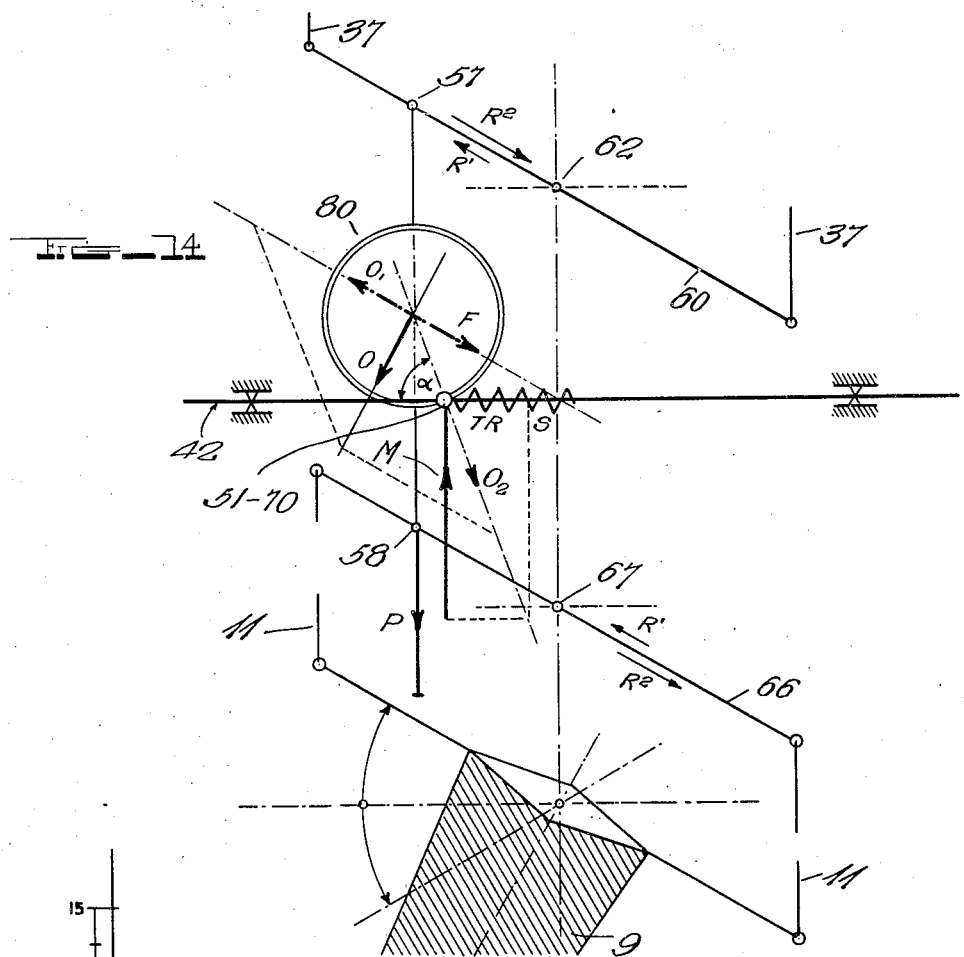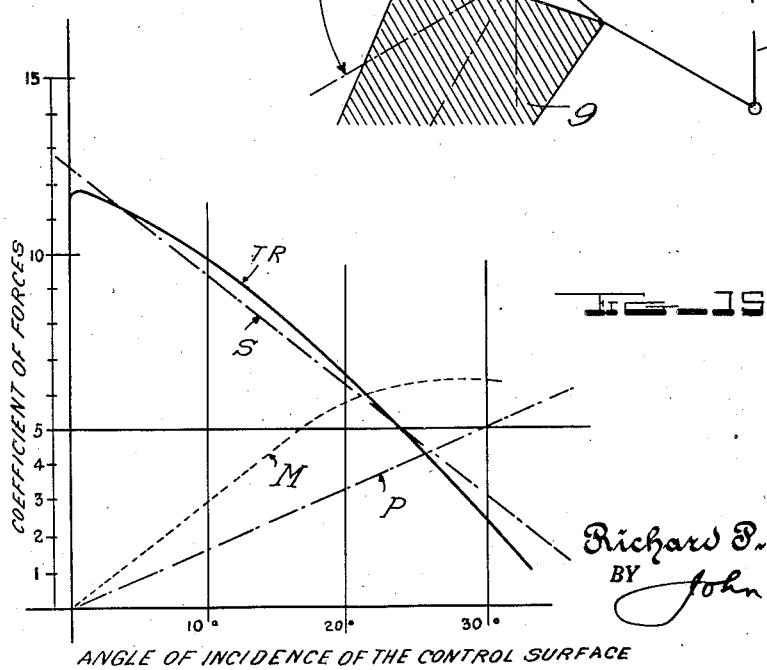

Patented Jan. 2, 1934

1,941,616

UNITED STATES PATENT OFFICE 1,941,616

AIRCRAFT CONTROL SYSTEM

Richard P. Mueller, New York, N. Y., assignor to John B. Brady, Somerset, Md.

Application July 5, 1932. Serial No. 620,918.

REISSUED

20 Claims. (Cl. 244—29)

My invention relates broadly to aircraft and more particularly to a mechanism for controlling the operation of aircraft.

One of the objects of my invention is to provide a construction of pressure compensating mechanism for preventing relatively large pressures which are established against the planes of an aircraft from interfering with the control forces applied by the pilot at the control mechanism of the aircraft.

Another object of my invention is to provide a construction of pressure compensating mechanism for the control of aircraft in which a graduated compensating force may be applied to the control mechanism proportional to the pressure incident against the planes of the aircraft.

Still another object of my invention is to provide a variable pressure compensating mechanism for control of an aircraft by which selected compensating forces are introduced to counteract pressures incident upon the control planes of the aircraft as such pressures increase or decrease with respect to the control planes.

A further object of my invention is to provide a construction of compensator for pressures incident against the planes of an aircraft whereby the control forces applied by the pilot at the controls of the aircraft are maintained substantially constant independent of the increase or decrease in the surface pressure against the rudder, elevator controls or ailerons.

A still further object of my invention is to provide a construction of parallelogram mechanism for a pressure compensator introduced between the control planes and the pilot control of an aircraft for accurately transmitting control forces from the pilot's position independently of large variations in surface pressure against the control planes.

Another object of my invention is to provide a construction of compensator employing a multiplicity of calibrated spring units each having different pressures which may be selectively rendered effective against the lever mechanism of the compensator for insuring continuous control of the control planes from the pilot's position independently of variations in surface pressure against the control planes of the airplane according to different velocities of the aircraft.

Other and further objects of my invention will be understood from the specification hereinafter following by reference to the accompanying drawings, in which:

Figure 1 is a perspective view of the device of my invention as applied to the fuselage of an airplane; Fig. 2 is a side elevation of the operating shaft carrying the pedal arrangement and chain wheels for adjusting the compensators for the aileron, rudder and elevator control of the aircraft; Fig. 3 is a schematic illustration showing the position of the parts when the rudder is swung to the left; Fig. 4 is a similar view showing the parts in the position they assume when the rudder is in a neutral position; Fig. 5 is a similar view showing the position the parts assume when the rudder is swung to the extreme right position; Fig. 6 is a horizontal sectional view showing the constructive details employed in carrying out my invention; Fig. 7 is a transverse vertical sectional view taken on line 7—7 of Fig. 6; Fig. 8 is a detailed vertical sectional view on line 8—8 of Fig. 6; Fig. 9 is a longitudinal sectional view taken on line 9—9 of Fig. 6; Fig. 10 is a horizontal sectional view taken on line 10—10 of Fig. 11, showing a modified form of my invention; Fig. 11 is a longitudinal sectional view taken on line 11—11 of Fig. 10; Fig. 12 is a transverse vertical sectional view taken on line 12—12 of Fig. 13; Fig. 13 is a transverse vertical sectional view taken on line 13—13 of Fig. 10; Fig. 14 is a schematic view disclosing the principles involved in the practical application of my invention; and Fig. 15 shows a characteristic curve of forces obtained by creating a balanced condition in the control system of my invention where an airplane is flying at a theoretically constant flight speed, where changes of the control surface pressure are but functions of changes of the control surface incidence, but not functions of changed wind velocities.

Referring to the drawings in detail, Fig. 1 is a perspective view illustrating the arrangement of the control system of my invention. The control mechanism at the pilot's position is described more fully in my application Serial No. 524,184, filed March 20, 1931, now Letters Patent No. 1,900,068, issued March 7, 1933. Reference character 1 designates the hand grip which is manipulated by the pilot for actuating the controls of the aircraft. The ailerons have been designated at 2 controlled through cables 3 actuated through levers 4 and 5, interconnected through cable 6 from the three way steering mechanism as will be more fully understood from the application hereinbefore referred to. The elevator planes are represented by reference character 7 controlled from the three way steering mechanism through a cable indicated generally at 8. The rudder is designated at 9 directly controlled through levers 10 connected through control cables 11 with the compensating mechanism designated generally at 12. The compensator mechanism will be described in more detail hereinafter. It will be seen that the compensator includes a parallelogram mechanism interconnected by a link member against which variable tension is rendered effective for compensating for pressures against the rudder 9. A similar compensator is employed between the control mechanism and the elevator planes and another compensator mechanism is employed between the control and the ailerons.

For the purpose of explaining the principles of my invention, the compensator has been illustrated in association with the controls leading to the rudder 9, but it will be understood that a similar compensator is provided at 13 for counterbalancing the pressure against the ailerons and at 14 for counterbalancing the pressure against the elevator planes 7. I have designated the pressure regulating mechanism for the compensators generally at 15 consisting of shaft 16 journaled at 17 and having a pair of foot pedals 18 for movement of shaft 16 in one direction and an intermediate foot pedal 19 connected to gears 20 with shaft 16 for moving shaft 16 in the opposite direction. As represented in Fig. 2, shaft 16 is provided with three sprocket members 21, 22 and 23 which normally run idle on shaft 16. However, three independent clutches 24, 25 and 26 are provided connected through links 27, 28 and 29 with the pressible foot levers 31, 32 and 33 which may be actuated to independently connect one or more of the sprockets 21, 22 and 23 with the shaft 16 and thereby impart movement to one or more of the chains 34, 35 and 36 for adjusting the compensator for the ailerons, the rudder or the elevator planes respectively as will be described in more detail hereinafter. By operation of any one of the foot levers 31, 32 and 33, pressure regulation for the compensator on one of the controls may be effected to the exclusion of the others or pressure regulation may be effected for two or all three of the controls by the selective actuation of the clutches. In many instances, it will be unnecessary to effect selective actuation of the compensators as all of the compensators may be functioned simultaneously. In lieu of the foot levers 31, 32 and 33 for synchronizing the operation of the compensators, I may employ a control wheel placed in a vertical longitudinally extending plane between the two pilot seats in the aircraft where the wheel may be connected through a chain and sprocket arrangement or through gearing with the compensators for selecting the amount of counterbalanced pressure rendered effective by the compensators. The structure of the several compensators is similar so that the description of the compensator indicated at 12 and used in the rudder control will suffice as a general description for all of the compensators.

Figs. 3, 4 and 5 schematically illustrate the position of the compensating mechanism for different positions of the rudder 9. Fig. 4 illustrates the position of the compensator mechanism when the rudder 9 is in neutral position. Fig. 3 shows the position of the compensator mechanism when the rudder 9 is swung to the left. Fig. 5 shows the position of the compensator mechanism when the rudder 9 is moved to the right. In each instance, the controls 37 are shown leading to the compensator mechanism for actuating the parallelogram levers from the three-way steering mechanism operated from the control indicated generally at 1.

The compensator mechanism is mounted in a frame consisting of a pair of side wall portions 38 and upper and lower cover portions indicated at 39. Supporting members 40 extend parallel to the side wall portions 38 and are secured thereto by means of clamps indicated at 41. The supporting members 40 connect with the fuselage of the aircraft for supporting the compensator in a position wherein the controls are aligned with the compensator. A shaft member 42 extends transversely through the frame structure as shown. In one of the side walls 38, there is mounted a bushing 43 having a keyway 43a cut therein adapted to be aligned with a keyway 42a in shaft 42. A key 44 extends longitudinally through the keyways 42a and 43a and serves as a guide for allowing transverse movement of shaft 42 through the frame of the compensator within certain limits as will be hereinafter explained in detail. In the opposite side wall 38, I mount a rotatable bushing 45 which is prevented from lateral displacement by reason of ring member 46 which is secured to rotatable bushing 45 as bushing 45 is inserted through the side wall 38 and locked in position therein by a set screw or other suitable means so that bushing 45 while anchored in the side wall 38 is free to revolve. The interior of bushing 45 is screw threaded to engage screw threads 47 which are formed on the axially and transversely movable shaft 42. The rotatable bushing 45 has an inner extension thereon indicated at 48 on the periphery of which sprocket teeth 49 are formed, which teeth engage the chain 35 leading from gear 22 adapted to be connected through clutch means 25 with shaft 16 actuated by the pilot pressing upon foot pedals 18 and 19. The pilot in pressing upon foot pedals 18 revolves shaft 16 in a clockwise direction. When gear 22 is connected with shaft 16 through clutch 25, chain 35 is driven for imparting motion to rotatable bushing 45 in a clockwise direction. Movement of the bushing 45 in a clockwise direction serves to advance shaft 42 through bushing 43 while maintaining the shaft in the same vertical plane. Shaft 42 carries a flange member 50 thereon. A sleeve member 51 is arranged to embrace the shaft 42 and project transversely therefrom for a distance sufficient to provide an abutting surface for the end of a coil spring 52 which is concentrically disposed about shaft 42 between the sleeve 51 and flange 50. As the shaft 42 advances toward the left, the tension exerted by spring 52 against sleeve 51 is increased. As shaft 42 advances toward the right, the tension in spring 52 is decreased. The sleeve 51 is provided with oppositely projecting pintles shown at 51a and 51b which extend into aligned recesses into parallel extending plates 53. Plates 53 are each mounted on ball bearing supports 54 carried by the hub portions 55 of the parallel plate members 56. The parallel plate members 56 each have diametrically extending elongated portions between the ends of which there is provided transversely extending connection members indicated at 57 and 58. The transversely extending connection 57 is formed by a bolt member extending through a sleeve 59 disposed between the parallel plate members 56. The sleeve 59 is connected with the set of parallel lever members 60 which are journaled adjacent one edge of the frame of the compensator. The journal for the parallel extending lever members 60 is formed by a sleeve 61 which has a portion extending between the lever members 60 and portions projecting above and below the lever members 60 and centered between the upper and lower plates 39 by means of a bolt member 62 extending through the upper and lower plates. The sleeve member 61 has an integral radially projecting extension 63 thereon which is adapted to move in an arcuate slot 64 formed in the plate member 65. The abutment of the radially extending arm 63 with opposite ends of the slot 64 formed in plate 65 limits the angular movement of lever members 60. Lever members 60 are controlled by connecting members 37 leading to the three-way steering device which is actuated from control 1. The other set of lever members constituting the parallelogram has been represented at 66 which levers have their opposite ends connected with controls 11 leading to the rudder 9. Lever members 66 are journaled in the compensator frame by means of bolt member 67. Lever members 66 have a sleeve formed integral therewith indicated at 68 which enables the lever members 66 to be revolved about the bolt member 68. Lever members 66 have bolt member 67 extending therethrough and through the spacing members 69 between the parallel plate members 56. The parallel plate members 56 are thus pivotally connected with lever members 66 and lever members 60 so that angular displacement of the set of lever members 60 by means of controls 37 produce corresponding displacements of the set of lever members 66. For the purpose of increasing rigidity, it will be observed that the sets of lever members 60 and 66 are in the nature of bowed frames united at their extremities and spaced from each other intermediate the extremities thereof. The connection of the parallel extending plate members 56 with the sets of lever members 60 and 66 is such that the parallel extending plate members are displaced toward or away from the center line extending through the pivot points 62 and 67 of lever members 60 and 66 in proportion to the angular displacement of the lever members. That is, as the angular distance through which the sets of lever members 60 and 66 increases, the center line of plate members 56 more closely approaches the center line of sets of levers 60 and 66 taken through pivot points 62 and 67 which is the condition represented in Figs. 3 and 5. On the other hand, as lever members 60 and 66 are restored to a parallel position normal to the control wires 11 and 37 and parallel to shaft 42, the distance between the center line of plate members 56 and the center line of the pivots 62 and 67 is increased to the maximum.

This condition enables the sleeve 51 to be subjected to varying opposing forces offered by spring 52. The effect of spring 52 is, as previously noted, directly controllable by movement of bushing 45 through chain 35 for transversely shifting the shaft 42. By the selective movement of shaft 42 transversely, various counterbalancing forces may be introduced against the movement of sleeve 51 for correspondingly balancing the movement of the plate members 56 toward the center line of the pivots of the sets of lever members 60 and 66 for thereby counterbalancing surface pressures incident upon the rudder 9.

Inasmuch as the surface pressures which must be compensated on large planes increase to relatively great proportions, provision must be made for increasing the compensating forces as the surface pressure increases. For this purpose I introduce a multiplicity of coil springs having different tension characteristics, which springs are shown more clearly in Figs. 10, 11, 12 and 13.

In this form of the invention the size of the sleeve 51 is increased and is given the form of a cylindrical member 70 which is slidable concentrically over shaft 42. A flange 71 is carried by sleeve 70. Sets of parallel rod members are secured in flange 71, one set of rod members being indicated at 72 shown in Fig. 13, another set being shown at 73 and a further set being shown at 74. These sets of rod members are disposed on diametrically opposite sides of the central transversely movable shaft 42. The ends of the rod members project through apertures formed in the plate member 75 which compares to the abutment 50 in Figs. 1, 6 and 9, except that its transverse area is enlarged to provide means for guiding the sets of rods 72, 73 and 74. The sets of rods which extend longitudinally about the central transversely movable shaft 42 each serve as supports for sets of coil springs having differing tension characteristics, for example the set of coil springs 76 located on rods 72 each have one tension characteristic. The set of coil springs 77 disposed on rod members 73 each have a different tension characteristic. Similarly the sets of coil springs 78 each have still another tension characteristic. These springs are rendered effective for compensating for surface pressure in a progressive order so that when the tension of one set of springs has been utilized the tension of the remaining sets of springs is brought into effect. The cylindrical member 70 is provided with pintles 70a and 70b which fit into recesses in the parallel extending plates 53 for subjecting the oppositely extending portions of the plates to tension of the selected coil springs for correspondingly controlling the sets of levers 60 and 66 and proportionally compensating for surface pressures incident upon the rudder. The sets of springs are brought into effect in predetermined order according to the movement of the foot pedals 18 and the corresponding shift of the bushing 45 for transversely moving the shaft 42. The shift from one set of springs to several of the sets of springs is effected in predetermined order, that is, the first set of springs 78 are first rendered effective in balanced relation to oppose the movement of the shaft 42 under predetermined tension. The set of springs 77 is next brought into coaction with the set of springs 78 as shaft 42 continues in its transverse movement toward the left. The set of springs 76 are then brought into coaction with the sets of springs 77 and 78 upon continued movement of shaft 42 toward the left. The central spring 52 is next brought into coaction with the sets of springs 77, 76 and 78 upon the further movement of foot pedals 18 and the further corresponding advance of shaft 42 toward the left. The displacement of the rudder 9 by increasing surface pressure can, therefore, be resisted by changes in the effective spring pressure tending to urge shaft 42 toward the left and resisting the tendency of the center line of the plate members 56 to approach the center line of the pivots 62 and 67. It will be clear that as the shaft 42 is shifted toward the left, the resistance offered the surface pressure against the rudder 9 is correspondingly increased.

In order to reduce the compensating force, the pilot operates pedal 19 thereby driving shaft 42 in the opposite direction relieving the plate members 53 from pressure in a transverse direction under control of the compensating springs. The compensating pressure may be entirely removed by movement of pedal 19 to a position where the coil springs are rendered ineffective to oppose the movement of plate members 53 with respect to the position of the pivots 62 and 67.

The spring arrangement provided in the compensator of my invention is based upon the theory graphically explained in Figs. 14 and 15. To fully understand the theory, I refer to Fig. 6 showing constructional details, and to Figs. 3 and 4. In Fig. 4 the compensator schematically is shown in a neutral position. Referring to Fig. 6 I assume that the spring 52 has a certain contraction, and that the chain wheel 48 does not exist. With the compensator in neutral (Fig. 4), the parallelogram levers 60 and 66 are parallel to shaft 42. In this position the coil spring has first maximum contraction (for a previously given adjustment), but this maximum contraction is now ineffective since the pressure of the coil spring 52 working against the sleeve member 51 is of a direction exactly through the center of the link 56, and thus also of a direction exactly through the center of plate 53 (Fig. 7). If now the pilot moves the control, with the effect as to pull cable 37, the levers 60 and 66 swing off neutral, thus approaching a position as schematically shown in Fig. 3. However, it is clear that, if the pilot brings about a displacement of levers 60 and 66 of but one degree rotation, the plates 53 necessarily have to rotate too and they will, as may be seen from the drawings (Fig. 6), rotate about twice as much as the levers 60 and 66. Therefore, even as soon as the compensator is brought but a trifle off its neutral position (Fig. 4), the contracted coil spring is rendered effective, since now its pressure does not work through the dead point, i. e. through the center of the link, or the plates 53, but tends to rotate the plates 53. However, the plates 53, pivotally connected with sleeve member 51, can rotate only when the distance between the axis of shaft 42 and the center of the link is being increased. Thus, the sliding sleeve member 51 under the pressure of the coil spring moving off the line of centers of the two pivoted levers 60 and 66, with the assistance of the shaft 42 as a reaction, "lifts" the link. Thereby the two levers 60 and 66 receive an angular displacement, and the center line of the link has a displacement towards the line of centers of the two pivoted levers 60 and 66. In Fig. 14 the rudder is schematically illustrated at 9, connected through control source 11 with the opposite ends of lever member 66. The compensating force increases as the angle $\alpha$ increases. The contraction of the coil spring decreases, but simultaneously the required reaction given by sleeve member 51 sliding over shaft 42 increases. The surface pressure is compensated inasmuch as the state of spring contraction approaches the required transverse reaction (TR) or its close normal ($s$) as indicated in Fig. 15. A ratio of two to one, or slightly better, should be selected by the angle $\alpha$ and the angle of surface incidents. The surface pressure on rudder 9 is indicated by letter P. This force may be vectorily analyzed into force O and force F. Force F has its reaction indicated at $R^1$. Force O may be vectorily analyzed into forces $O_1$ and $O_2$. Force $O_1$ has a reaction $R^2$. Force $O_2$, however, extends through the point of force transmission at 51—70. In creating a reaction to force $O_2$ at this point, the control surface pressure, that is, the pressure P is compensated. The required reactions are M produced by the shaft 42 and TR furnished by the potential energy in the spring system. The spring system is in a neutral position when the parallelogram lever members 60 and 66 are parallel to the shaft 42. Because of variations in surface pressure due to different wind velocities, the system must be adapted to compensate for various wind velocities. It is for this reason that one spring device is not sufficient and that a multiplicity of sets of springs must be employed. The different sets of springs are so dimensioned that the contraction is sufficient to compensate different surface pressures equivalent to different wind velocities. The manipulation of the foot pedals 18 to bring the different sets of springs into effect may be considered as the movement of the compensator to a "first shift position", "second shift position", "third shift position" and "fourth shift position". When fully released, the controls may be slightly stiff in reversed direction with the airplane on the ground, but in taking off or in landing, the surface pressure is fully compensated with no forces in the controls and, in climbing with increasing speed, the surface pressure would gradually become more noticeable, equivalent to the difference of the control surface pressure not compensated. The pilot makes but one manipulation to shift the springs from their released position to first, in order to have, for example, a 100 m/h velocity compensated. With additional increase in speed, the difference in actual surface pressure and compensated surface pressure would be reflected in the controls. Arriving at approximately 140 m/h flight speed, the pilot, again by but one movement, shifts to "second". With this manipulation, by means of the shift device and the gear and the shaft, the pilot advances the transversal shaft and thereby brings the second group of springs in the proper position for its basic-contraction, dimensioned so that this second group, together with the now more contracted first group compensates a surface pressure equivalent to about 150 m/h velocity. Similarly, a next shift manipulation adjusts the conditions for higher flight speed, the third shift being dimensioned for a compensation of 175 m/h velocity. Additional contraction, if necessary, would take care of emergency conditions where one sided motor power affects the control surfaces.

In Fig. 15 I have shown the characteristic curve for obtaining a balanced condition of operation of the controls, for a condition where an airplane is assumed flying at a theoretically constant flight speed. In such a condition, the changes of control surface pressure are but functions of the changes of the control surface incidence. From this may be seen, that the compensator, the theory of which has been explained, must provide an arrangement for varying flight speed conditions. To this end, the spring adjusting device, operated from the cockpit, providing the adjustment of the spring or of the several springs, has been introduced. Thus the spring adjusting device serves to adjust the inner spring energy of the compensator for any desired flight speed of the airplane. After the adjustment has been made by the pilot, the compensator again works entirely automatically. Therefore, the spring adjusting device operated from the cockpit serves to adjust the compensator for changes of control surface pressure resulting from changes of the flight speed, or the wind velocity respectively.

The system of my invention is desirable in large transport planes and dirigibles in which the control surface is necessarily large. The pilots, by use of the compensating system of my invention, are enabled to control the angular position of the control planes with precision and with slight physical exertion or strain, which would, otherwise, be the condition experienced in attempting to move large control surfaces against large wind velocities.

In describing the arrangement of springs in the control system of my invention, I have selected only one embodiment of my invention as I realize that other mechanism may be employed for varying the compensating forces according to wind velocities and I desire that it be understood that, although I have described my invention in one of its preferred embodiments, that modifications may be made and that no limitations upon my invention are intended other than are imposed by the scope of the appended claims.

What I claim as new and desire to secure by Letters Patent of the United States is as follows:

1. In a control system for aircraft, an aircraft including ailerons, rudder and elevator planes, a pilot control, and means interconnecting said pilot control with said rudder, ailerons, and elevator planes, said means including a force compensating mechanism automatically increasing or decreasing its compensatory effect in accordance with changes of the control surface pressure resulting from changes of the control surface incidence, for counteracting the effect of surface pressure on said ailerons, elevator planes and rudder with respect to said pilot control.

2. In an aircraft, a rudder, ailerons, and elevator planes, a pilot control, means interconnecting said pilot control with said ailerons, rudder and elevator planes, said means including mechanism for counteracting the effect of surface pressure to any desired degree of the prevailing control surface pressure for a control surface incidence from zero to maximum, on said ailerons, rudder and elevator planes with respect to said pilot control according to the pressure exerted thereagainst under conditions of changing velocity.

3. In an aircraft, a set of ailerons, elevator planes and a rudder, a pilot control, means interconnecting said pilot control with said set of ailerons, elevator planes and said rudder, and means interposed in said last mentioned means for counteracting the effect of surface pressure on said set of ailerons, elevator planes and rudder with respect to said pilot control, and means connected with said last mentioned means for selectively modifying the counteracting force for introducing a predetermined counteracting force for predetermined velocities and accompanying surface pressures.

4. In an aircraft control system, an aircraft having ailerons, elevator planes and a rudder, a pilot control, means interconnecting said pilot control with said ailerons, elevator planes and rudder, a force compensating device interposed in said connection means, and separate means for selectively controlling said force compensating device for modifying the force at which pressures incident upon said ailerons, elevator planes and rudder are rendered effective upon said pilot control.

5. A pressure compensator for aircraft comprising in combination with a movable plane member, a control for varying the angular position of said plane, and means interposed between said control and said movable plane comprising a pair of parallel extending pivoted levers, a link interconnecting said levers for transmitting forces between said control and said movable plane, and means for controlling the lateral pressure effective upon said link.

6. In a pressure compensator for aircraft, the combination of an angularly movable plane, a control member, and means interconnecting said control member and said angularly movable plane comprising a pair of parallel extending pivoted levers, a link interconnecting said pivoted levers, and spring means laterally effective against substantially the central portion of said link for controlling the displacement of said link in the direction of the pivots of said parallel extending levers for opposing effective wind pressure against said angularly movable plane.

7. A pressure compensating mechanism for aircraft, comprising in combination an angularly movable plane, a control, means interconnecting said control and said angularly movable plane comprising a pair of parallel extending pivoted levers, a link interconnecting said levers at a position remote from the pivots thereof, and spring means effective against substantially the central portion of said link for controlling the displacement of said link toward the pivots of said levers for compensating for wind pressure incident against said movable plane.

8. In a pressure compensating system for aircraft, a movable plane, a control, cables interconnecting said control and said movable plane, means interconnected with said cables comprising a pair of parallel extending pivoted lever members, a link interconnecting said lever members in positions remote from the pivots of said lever members and constituting a force transmitting means between said lever members, a coil spring effective against substantially the central portion of said link, and means for varying the contraction of said coil spring for controlling the displacement of said link toward the line of centers of said pivoted lever members for compensating for surface pressure incident against said movable plane.

9. In a pressure compensating system for aircraft, the combination with an angularly movable plane, a control means interconnecting said control and said angularly movable plane, said means including a pair of parallel extending pivoted lever members connected at their opposite extremities with the aforesaid means, a link interconnecting said parallel extending lever members, and resilient means for controlling the displacement of said link toward the line of centers of said parallel extending lever members.

10. In a pressure compensating system for aircraft, the combination with an angularly movable plane, a control means interconnecting said control and said angularly movable plane, said means including a pair of parallel extending pivoted lever members connected at their opposite extremities with the aforesaid means, a link interconnecting said parallel extending lever members, resilient means for controlling the displacement of said link toward the line of centers of said parallel extending lever members, and means operative from a position adjacent said control for varying the effective resistance of said resilient means to pressures incident against said movable plane.

11. In a pressure compensating system for aircraft, the combination with a control, an angularly movable plane, means interconnecting said control with said angularly movable plane, said means including a pair of parallel extending lever members pivoted at their centers and connected at their extremities with said means, a link interconnecting said lever members, means for limiting the angular displacement of said lever members for effecting a predetermined angular shift in the position of said plane while the center line of said link varies in its spacial relation with respect to the center line of the pivots of said lever members, resilient means for controlling the displacement of said link toward the line of centers of said lever members, and means for varying the force effective against substantially the central portion of said link to compensate for surface pressures effective against said movable plane.

12. In a pressure compensator for aircraft, a frame structure, a shaft member extending transversely through said frame structure, screw threads on one end of said shaft member, a rotatable sleeve journaled in said frame structure and engaging the screw threads on said shaft, means for rotating said sleeve for laterally displacing said shaft, a pair of parallel extending lever members pivoted with respect to said frame structure, control means connected with the extremities of one of said lever members, an angularly movable plane, means interconnecting the other of said parallel extending lever members with said angularly movable plane, a link interconnecting said lever members and displaceable with respect to the center line of said pivoted lever members, and spring means operative under control of said laterally shiftable shaft and effective against substantially the central portion of said link for opposing the effects of wind pressure against said plane.

13. In a pressure compensator for aircraft, a frame structure, a laterally shiftable shaft disposed in said frame structure, means engaging one end of said shaft for controlling the displacement of said shaft laterally of said frame structure, a pair of parallel extending lever members pivoted on said frame structure, a control mechanism connected with one of said lever members, an angularly shiftable plane connected with the other of said parallel extending lever members, a link interconnecting said parallel extending lever members remote from the pivot points of said parallel extending lever members, a sleeve member connected with said link and embracing said transversely shiftable shaft, and a coil spring carried by said transversely shiftable shaft and effective against said sleeve for opposing surface pressures incident against said plane.

14. In a pressure compensator for aircraft, a frame structure, a pair of parallel extending lever members pivoted with respect to said frame structure, a control mechanism connected with the extremities of one of said lever members, an angularly shiftable plane area connected with the extremities of the other of said lever members, a link extending between said lever members in a position remote from the pivots thereof, the center line of said link varying in position with respect to the center line of the pivots of said lever members in accordance with the angular displacement of said plane area, a shaft extending through said frame structure normal to the center line through the pivots of said lever members, a sleeve disposed concentrically with respect to said shaft, a coil spring carried by said shaft and axially effective against said sleeve, and means for laterally shifting said shaft for varying the force offered by said spring to the movement of said link with respect to the center line of pivots of said lever members and the angular displacement of said plane area under varying conditions of wind pressure.

15. In a pressure compensator for aircraft, a frame structure, a pair of parallel extending lever members pivoted with respect to said frame structure, a control mechanism connected with the extremities of one of said lever members, an angularly shiftable plane area connected with the extremities of the other of said lever members, a link extending between said lever members in a position remote from the pivots thereof, the center line of said link varying in position with respect to the center line of the pivots of said lever members in accordance with the angular displacement of said plane area, a shaft extending through said frame structure normal to the center line through the pivots of said lever members, a flange carried by said shaft, a plurality of sets of rod members carried by said sleeve and extending parallel to said shaft and slidable through the flange on said shaft, sets of coil springs disposed concentrically upon each of said sets of shafts, a central coil spring carried by said shaft member extending between the end of said sleeve and the flange on said shaft, said sets of coil springs and said central coil spring each having different tension characteristics, and means for shifting said shaft laterally for rendering said sets of coil springs and said central coil spring progressively effective for controlling the displacement of said link toward the line of centers of the pivots of said lever members under conditions of increasing surface pressure against said plane area.

16. In a pressure compensator for aircraft, a frame structure, a pair of parallel extending lever members pivoted with respect to said frame structure, a control mechanism connected with the extremities of one of said lever members, an angularly shiftable plane area connected with the extremities of the other of said lever members, a link extending between said lever members in a position remote from the pivots thereof, the center line of said link varying in position with respect to the center line of the pivots of said lever members in accordance with the angular displacement of said plane area, a shaft extending through said frame structure normal to the center line through the pivots of said lever members, a sleeve disposed concentrically with respect to said shaft, a plurality of coil springs of different tension characteristics effective against said sleeve, and means for selectively rendering said coil springs progressively effective against said sleeve with a cumulative force for compensating for increasing surface pressures against said plane area.

17. In a pressure compensator for aircraft, a frame structure, a pair of parallel extending lever members pivoted with respect to said frame structure, a control mechanism connected with the extremities of one of said lever members, an angularly shiftable plane area connected with the extremities of the other of said lever members, a link extending between said lever members in a position remote from the pivots thereof, the center line of said link varying in position with respect to the center line of the pivots of said lever members in accordance with the angular displacement of said plane area, a shaft extending through said frame structure normal to the center line through the pivots of said lever members, a sleeve disposed concentrically with respect to said shaft, a plurality of coil springs each having different tension characteristics against said sleeve, said coil springs disposed symmetrically on centers on opposite sides of said shaft extending in diametrical lines through said shaft, and means controlled by the lateral displacement of said shaft for rendering said coil springs selectively effective for cumulative action with respect to the displacement of said link toward the line of centers of said pivoted lever members for opposing the effects of surface pressure against said plane area.

18. A pressure compensating system for aircraft, comprising in combination with an angularly movable plane area a housing, means for supporting the housing with respect to the fuselage of an aircraft, a pair of lever members pivoted adjacent opposite ends of said housing, a link member interconnecting said lever members, a shaft member extending transversely through said housing in a position intermediate said lever members, a sleeve member slidable over said shaft, a pivotal connection between said sleeve member and said link member, a plurality of resilient means operative with respect to said sleeve member for compensating for the effects of surface pressure against said angularly movable plane area, and means for selecting the number of said resilient means which are rendered effective with respect to said link member.

19. In an aircraft, a rudder, a set of elevator planes and a set of ailerons, means for independently adjusting said rudder, elevator planes and ailerons, pressure means for compensating for wind pressure effects against said rudder, elevator planes and ailerons, and a set of clutches for selectively rendering any one of said last mentioned means effective independently or all of said last mentioned means effective simultaneously.

20. In an aircraft, a rudder, a set of elevator planes and a set of ailerons, means for independently adjusting said rudder, elevator planes and ailerons, pressure means for compensating for wind pressure effects against said rudder, elevator planes and ailerons, and a set of manually actuated clutches for rendering said means simultaneously effective to oppose wind pressure effects on said rudder, elevator planes and ailerons, or individually effective to oppose wind pressure effects on either said rudder, said elevator planes or said ailerons at selected compensating pressures.

RICHARD P. MUELLER.